United States Patent
David et al.

(10) Patent No.: US 6,267,543 B1
(45) Date of Patent: Jul. 31, 2001

(54) LATCH WITH SPRING

(75) Inventors: Anthony Joseph David, Omaha, NV (US); Jason A. Kay, Morristown; David Stevens Kerr, Morris Plains, both of NJ (US); Ronald Marchisin, Toby Hanna; Ivan Pawlenko, Holland, both of PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/417,708

(22) Filed: Oct. 13, 1999

(51) Int. Cl.⁷ ..................................... F16B 21/00
(52) U.S. Cl. ..................... 411/552; 411/549; 411/553
(58) Field of Search ................... 411/349, 549, 411/550, 551, 552, 553

(56) References Cited

U.S. PATENT DOCUMENTS

| | | |
|---|---|---|
| Re. 30,801 | 11/1981 | Gley . |
| 2,368,799 * | 2/1945 | Barlow ................................. 411/552 |
| 3,169,293 * | 2/1965 | Neuschotz ............................ 411/552 |
| 4,007,516 | 2/1977 | Coules . |
| 4,212,560 | 7/1980 | Pufpaff et al. . |
| 4,262,394 | 4/1981 | Wright . |
| 4,391,461 | 7/1983 | Deibele . |
| 4,657,462 * | 4/1987 | Hoen .................................... 411/552 |
| 4,832,524 | 5/1989 | Olgren . |
| 4,893,978 | 1/1990 | Frano . |
| 5,052,849 | 10/1991 | Zwart . |
| 5,123,795 | 6/1992 | Engel et al. . |
| 5,370,488 * | 12/1994 | Sykes ............................. 411/552 X |
| 5,509,703 | 4/1996 | Lau et al. . |
| 5,630,632 | 5/1997 | Swan . |

FOREIGN PATENT DOCUMENTS

1136662 * 12/1968 (GB) ................................... 411/553

* cited by examiner

Primary Examiner—Neill Wilson
(74) Attorney, Agent, or Firm—Dickstein Shapiro Morin & Oshinsky LLP

(57) ABSTRACT

A quarter-turn latch for fastening a first panel to a second panel includes a bolt with a bayonet key that rotationally engages a keyhole in the second panel, and a capture key that engages with the first panel to prevent loss of the bolt. A track on the underside of the second panel, surrounding a portion of the keyhole, secures the bolt in the closed position. Bump stops engageable with the bayonet key define open and closed positions. A spring integrated with the bolt prevents rattles, overcomes misalignment and/or assists disengagement of the latch. The system may be used, for example, in network interface devices (NIDs), plastic enclosures, and other devices.

34 Claims, 2 Drawing Sheets

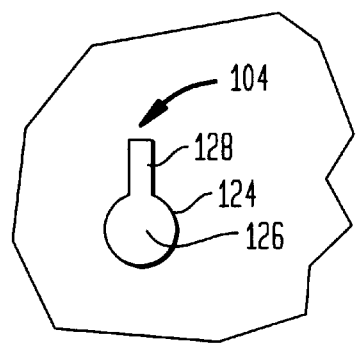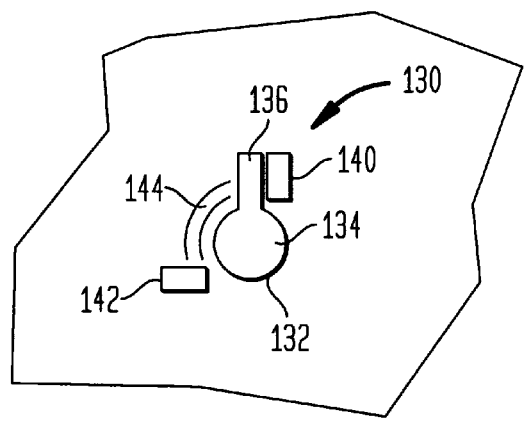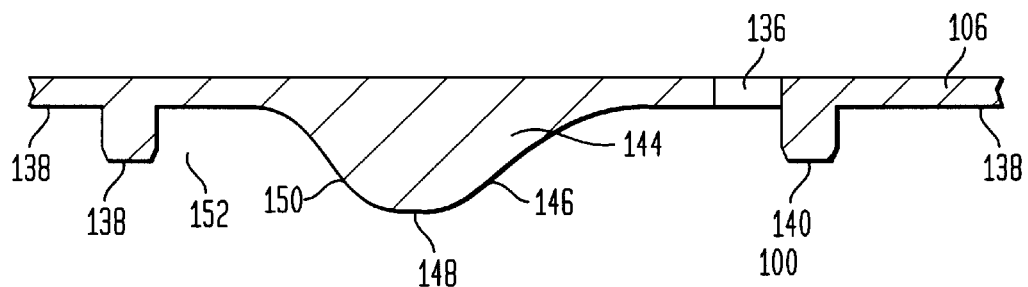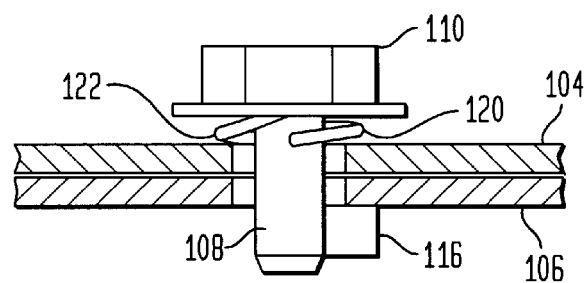

LATCH WITH SPRING

FIELD OF THE INVENTION

The present invention relates to fasteners for removably securing together two panels or other objects. More particularly, the present invention relates to a quarter-turn panel fastener having a spring.

BACKGROUND OF THE INVENTION

Many types of fasteners are used to removably attach one panel to another. Often, sheet metal screws or machine screws, with or without nuts, are used for these tasks. Although these screw type fasteners will securely fasten one panel to another and are readily unfastened, they are inadequate for many applications. For instance, screw type fasteners take too long to assemble and disassemble, require relatively precise tolerances in panel fit, and are subject to cross-threading, stripping, and under- or over-tightening. There is a need for fasteners that are quick and easy to use, and that positively engage. This is particularly true in light industrial applications such as the computer industry, where it is desired to attach various loose-fitting components and covers in a positive secure fashion that allows such covers and components to be easily installed and removed.

Quarter-turn latches are used for latching a variety of cabinets, doors and other enclosures. It has been suggested to construct a quarter-turn fastener as shown in FIG. 1. A bolt 1 has a disk-shaped head 2 and a cylindrical shank 3. Two projecting keys 4, 5 project radially outward from the shank 3 opposite one another. A keyhole 6, shown in FIG. 2, is made in each panel 10, 11 to be adjoined. The keyhole 6 consists of a circular hole 7 with two radially extending rectangular slots 8, 9 opposite one another. In operation, the top panel 10 is placed over the bottom panel 11 with the keyhole in each panel aligned. The bolt 1 is guided through the panels 10, 11 and the keys 4, 5 simultaneously pass through the slots 8, 9.

The bolt is twisted 90°, placing the keys 4, 5 in the positions 12, 13 shown by dotted lines in FIG. 2, effectively locking the panels 10, 11 together. A coil spring 14 coaxially surrounds the shank 3 and is compressed between the bolt head 2 and the top panel 10. The compressed spring 14 pulls the keys 4, 5 against the underside of the bottom panel 11, holding the bolt 1 in position by friction. Thus, the spring 14 provides a compressive biasing force that pulls the panels 10, 11 together for positive engagement and to avoid rattles.

Drawbacks exist with many quarter-turn latches. For instance, they can be susceptible to operator error. Without positive engagement, the operator can turn the bolt too far, or not far enough. The bolt can rotate to the unlocked position due to vibration. In addition, the coil spring adds purchase and assembly costs, and can be lost. Consequently, there is a need for a quarter-turn fastener which is simple, inexpensive, requires a minimum number of parts, and provides positive engagement.

SUMMARY OF THE INVENTION

The present invention relates to a fastener system for fastening a first panel in which is formed a first keyhole to a second panel in which is formed a second keyhole. According to one aspect of the invention, the fastener system includes a bolt with a head, a spring member integrally formed with the head, a shank, and a first key attached to the shank opposite the head. The bolt passes through the first keyhole and the second keyhole, when the first key is aligned with a first slot in the first keyhole and a second slot in the second keyhole. The bolt is rotatable from an open position where the first key is aligned with the first slot and the second slot, to a closed position where the first key bears against a back surface of the second panel. The spring cooperates with the first key to bias the first panel to the second panel.

In a preferred embodiment of the invention, an annular track is located on the back surface of the second panel and slopes to a crest and recedes to a landing area. The first key is retained in the landing area by the biasing force of the spring member. An open bump stop is located on the back surface of the second panel adjacent the first slot portion and is engageable with the first key when the bolt is in the open position. A closed bump stop is located on the back surface of the second panel adjacent the landing area and is engageable with the first key when the bolt is in the closed position.

The bolt may have a second key located on its shank between the head and the first key. In a preferred embodiment of the present invention, the second key fits through the first slot in the first panel and engages a back surface of the first panel when the bolt is rotated away from the entry position of the second key in the first slot. The second panel may be recessed away from the first panel to provide room for the second key.

The present invention should not be limited to the preferred embodiments shown and described in detail herein. The above and other advantages and features of the invention will be more readily understood from the following detailed description and the accompanying drawings.

BRIEF DESCRIPTION OF THE DRAWINGS

FIG. 6 is a plan view of the keyhole in the top panel of the system of FIG. 3.

FIG. 7 is a bottom view of the bottom panel of the quarter-turn latch system of FIG. 3.

FIG. 8 is a profile projection view of the track and bump stops of FIG. 7.

FIG. 9 is a sectional side view of another quarter-turn latch system constructed in accordance with the present invention.

DETAILED DESCRIPTION OF PREFERRED EMBODIMENTS

Figure 1:
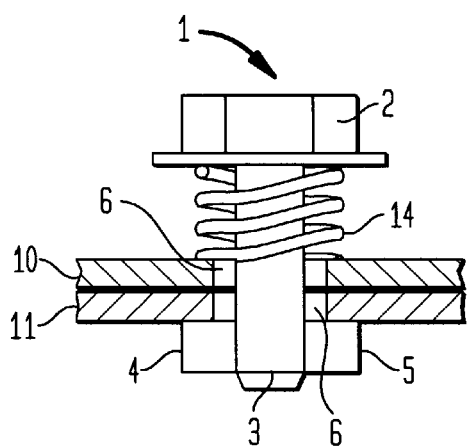
FIG. 1 is sectional side view of a quarter-turn latch system.
Figure 2:
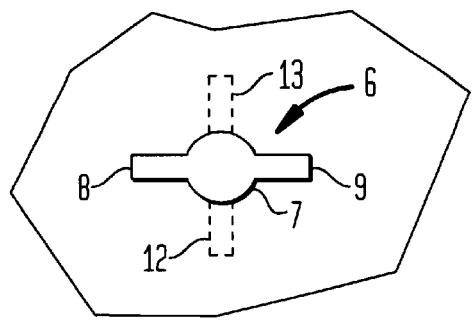
FIG. 2 is a plan view of a portion of a panel illustrating the keyhole of the quarter-turn latch system of FIG. 1.
Figure 3:
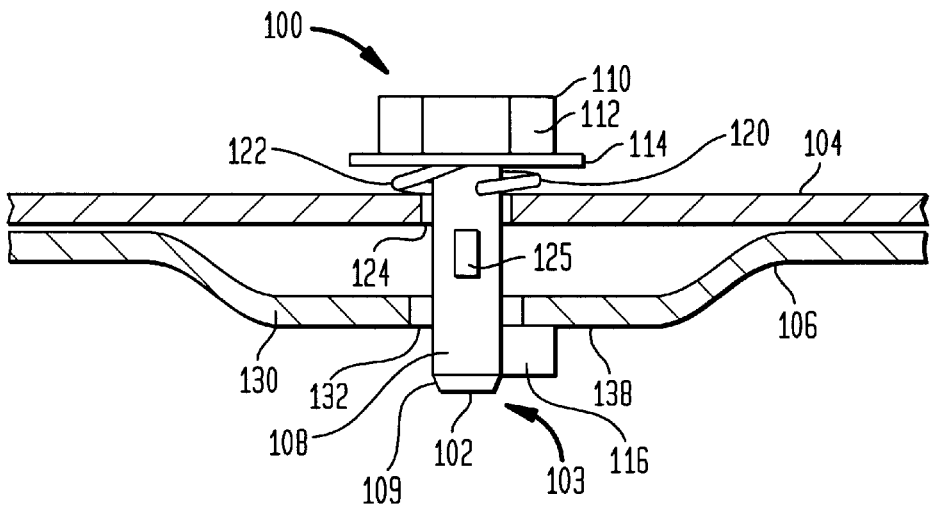
FIG. 3 is sectional side view of a quarter-turn latch system constructed in accordance with the present invention.

FIG. 3 shows a quarter-turn latch system 100 that has a rotatable bolt 102 for locking a top panel 104 to a bottom panel 106. The panels 104, 106 are referred to as top and bottom for ease in exposition. It should be understood, however, that the invention can be employed in many different orientations. The bolt 102 is preferably integrally formed in one piece. In a preferred embodiment of the invention, the bolt 102 is integrally molded from plastic resin. The bolt 102 consists of a cylindrical shank 108 with a disk-shaped head 110. The head 110 is coaxially located at one end of the shank 108.

The head 110 consists of a hexagon-shaped portion 112 and a circular shoulder 114. The hexagon-shaped portion 112 may be engaged by a wrench (not shown). The shoulder 114 is located between the hexagon-shaped portion 112 and the shank 108. The shoulder 114 may be used to promote positive wrench engagement and to prevent the wrench from marring the top panel 104. Alternatively, other types of heads may be used, including those incorporating screwdriver slots, thumb screws and other suitable torque transmitting means.

Figure 4:
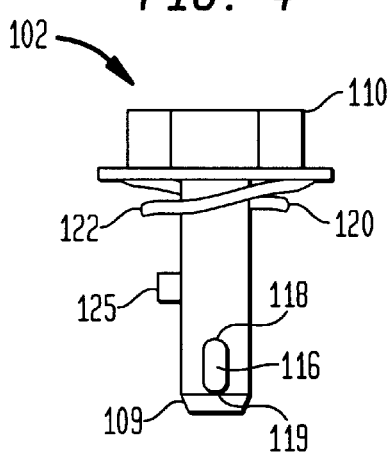
FIG. 4 is a front view of the bolt of the quarter-turn latch system of FIG. 3.
Figure 5:
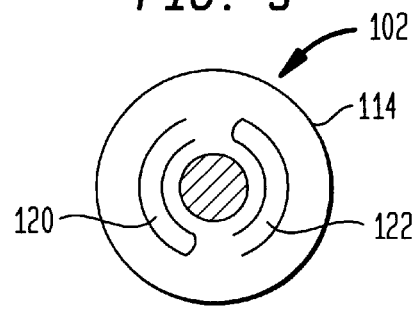
FIG. 5 is an axial sectional view of the underside of the head of the bolt of FIG. 4.

The end 103 of the shank 108 opposite the head 110 has a chamfered shoulder 109. Near the end 103 of the shank 108 is a rectilinear bayonet key 116, extending radially away from the shank 108. The key 116 has rounded surfaces 118, 119 facing towards and away from the head 110. A capture key 125 also extends radially from the shank 108 between the head 110 and the bayonet key 116. The capture key 125 is out of phase with the bayonet key by 90°. Two integral, resilient, flexible, curved spring members 120, 122 emanate from the head 110 of the bolt 102 facing the top panel 104. As shown in FIG. 4, each spring member 120, 122 defines a gentle, S-shaped curve, with one end of the "S" being integrally attached in one piece to the head 110. Viewed in the axial direction of the bolt 102, as shown in FIG. 5, each spring member 120, 122 defines a curved arc (a portion of a circle). Alternatively, each spring member could define a straight section when viewed in the axial direction. When compressed between the head 110 and the top panel 104, the spring members 120, 122 store elastic energy.

Referring now to FIG. 6, the top panel 104 has a keyhole 124. The keyhole 124 extends through the top panel 104. The keyhole 124 consists of a circular hole 126 with a rectangular slot 128. The slot 128 projects radially away from the center of the hole 126. Referring back to FIG. 3, the bottom panel 106 has a recessed portion 130 dimpled away from the top panel 104. As shown in FIG. 7, the recessed portion 130 has a keyhole 132 through it, of identical shape to the keyhole 124 of the top panel 104. The bottom panel keyhole 132 consists of a circular hole 134 with a rectangular slot 136 projecting radially from the center of the hole 134. As noted above, the present invention should not be limited to the specific structures and instrumentalities described herein.

The underside 138 of the bottom panel 106 (the side 138 facing away from the top panel 104) has a rectilinear open bump stop 140. The open bump stop 140 projects downwardly from the bottom panel 106 (away from the top panel 104). In the illustrated embodiment, the open bump stop 140 is located immediately and rotationally adjacent to the rectangular slot 136 of the keyhole 132. A rectilinear closed bump stop 142 also projects from the underside 138 of the bottom panel 106. The closed bump stop 142 is located in a position that would be immediately and rotationally adjacent to the rectangular slot 136 opposite the open bump stop 140, if the keyhole 132 were rotated 90° counterclockwise (as viewed in FIG. 7). As discussed in more detail below, the open bump stop 140 and the closed bump stop 142 prevent rotation of the bolt 102 past its fully open or fully closed positions.

Located between the rectangular slot 136 and the closed bump stop 142 on the underside 138 of the bottom panel 106 is a raised, annular (curved) track 144. The track 144 is straightened out in the projection of FIG. 8 to illustrate its profile. Starting at the rectangular slot 136, the track 144 gently projects away from the underside 138 of the bottom panel 106 forming a first sloped portion 146. The sloped portion 146 may form an angle of about 35° with respect to the underside 138 of the panel 106. The track 144 then gently curves back towards the underside 138, forming a crest 148 and then a second sloped portion 150 returns to the underside 138 of the bottom panel 106.

The second sloped portion 150 may form, for example, an angle of approximately 60° with respect to the panel underside 138. The track 144 ends prior to reaching the closed bump stop 142, such that a landing area 152 is defined adjacent to the closed bump stop 142. In a preferred embodiment of the invention, the depth of the crest 148 above the underside 138 is approximately equal to the thickness of the key 116. The length of the landing area 152, measured from the closed bump stop 142 to the transition from the slope 150 to the crest 148, may be about one and one-half the thickness of the key 116.

In operation, the bolt 102 is axially guided through the keyhole 124 so that the bayonet key 116 passes through the rectangular slot 128. The bolt 102 is then twisted 90° so that the capture key 125 also passes through the rectangular slot 128. The chamfered shoulder 109 of the bolt 102 and the rounded surface 119 of the key 116 promote entry of the bolt 102 through the keyhole 124. The bolt 102 is then twisted further, loosely locking it into engagement with the top panel 104. The capture key 125 is axially located along the bolt shank 108 so that the spring members 120, 122 are either lightly compressed or uncompressed. In this manner, the bolt 102 can be easily engaged or disengaged with the top panel 104, but is unlikely to accidentally disengage. Accidental disengagement would require the bolt 102 to randomly move until both the capture key 125 and the bayonet key 116 are sequentially aligned with and pass through the rectangular slot 128.

To fasten the top panel 104 to the bottom panel 106, the top panel 104 is brought into engagement with the bottom panel 106. The chamfered point 109 of the bolt 102 engages with the keyhole 134. The operator (not shown) then simultaneously pushes the bolt 102 against the resisting force of the spring members 120, 122, and twists the bolt 102 until the key 116 engages with the rectangular slot 136. At this point, the key 116 will pass through the keyhole 134 and the quarter-turn latch will be ready for engagement.

The operator then twists the bolt 102 clockwise 90°. During this twisting movement, mild resistance will be felt by the operator as the key 116 travels over the sloped portion 146 and the crest 148. The key 116 then settles into the landing area 152 and is stopped by the closed bump stop 142. The rounded surface 118 promotes a smooth cam operation between the key 116 and the track 144. The arrest of angular motion effected by the closed bump stop 142 is a positive indicator to the operator that the quarter-turn latch system 100 is in the closed position.

In the closed position, the force provided by the compressed spring members 120, 122 keeps the key 116 in the landing area 152 by resisting movement of the key 116 over the sloped portion 150. The spring force also prevents rattles and other movements by drawing the top panel tightly against the bottom panel 106. The spring members 120, 122 also compensate for any minor misalignment of the latch system 100.

To unfasten the top panel 104 from the bottom panel 106, the operator twists the bolt 102 counterclockwise, overcoming the resistance required to pass the key 116 over the sloped portion 150 and the crest 148 of the track 144. The bolt 102 is twisted until the key 116 is stopped by the open bump stop 140. The arrest of angular motion effected by the open bump stop 140 is a positive indication that the bolt 102 is in the open position. When the operator releases the bolt 102 in the open position, the bolt 102 pops up through the keyhole 134 as the integral springs 120, 122 decompress. Thus, release of the bolt 102 in the open position causes the key 116 to move into the space between the two panels 104, 106.

In an alternative embodiment of the invention shown in FIG. 9, the capture key 125 is omitted and the bottom panel 106 is not dimpled. The embodiment of FIG. 9 is otherwise essentially the same as the embodiment shown in FIGS. 3–8.

The present invention provides an economical quarter-turn latch system that easily and positively fastens panels together and that features one or more integral springs. Variations of the disclosed embodiments will be apparent to those skilled in the art. For instance, the invention could be practiced with different shaped springs, different numbers of springs, or with two bayonet keys. Accordingly, it is to be understood that although the present invention has been described with reference to exemplary embodiments, various modifications may be made without departing from the spirit or scope of the invention which is defined by the claims appended hereto.

What is claimed is:

1. A fastener for fastening a first panel to a second panel, said fastener comprising:
 a head for twisting said fastener;
 elongated leaf spring members integral with said head for biasing said first and second panels together; and
 a fastening key spaced from said head, said key being engageable directly with an integral surface of said second panel.

2. The fastener of claim 1, wherein said head, said spring members and said key are integrally molded in one piece.

3. The fastener of claim 2, wherein said head is disk shaped.

4. The fastener of claim 3, wherein said head has an exterior profile which is engageable with a wrench.

5. The fastener of claim 1, wherein said spring members are located within the radial extent of said head.

6. The fastener of claim 1, wherein said spring members rest directly on an integral surface of said first panel.

7. A fastener for fastening a first panel to a second panel, said fastener comprising:
 a head for twisting said fastener;
 a spring member integral with said head for biasing said first and second panels together; and
 a fastening key spaced from said head, said key being engageable directly with an integral surface of said second panel; and
 wherein said head, said spring member and said key are integrally molded in one piece; and
 wherein said fastener further comprises a capture key located between said head and said fastening key, said capture key fitting through a slot and engaging said first panel when said fastener is rotated.

8. The fastener of claim 7, wherein said fastening key extends in a first direction, and said capture key extends in a second direction, said first direction being different from said second direction.

9. The fastener of claim 8, wherein said second direction is perpendicular to said first direction.

10. A fastener system, comprising:
 a bolt having a key;
 a first panel; and
 a second panel having a keyhole, a back surface, and a track integrally formed on said back surface, said track having a crest and a landing area, and said track being engageable directly with said key, and wherein said bolt fits through said keyhole in said second panel.

11. The fastener system of claim 10, further comprising a spring for resiliently retaining said key in said landing area.

12. The fastener system of claim 11, wherein said spring rests directly on an integral surface of said first panel.

13. The fastener system of claim 11, further comprising a projecting open bump stop located on said back surface adjacent said keyhole.

14. The fastener system of claim 13, further comprising a bump stop located on said back surface engageable with said key in a closed position.

15. A fastener system, comprising:
 a bolt having a head, elongated leaf spring members integral with said head, a shank, and a fastening key attached to said shank opposite said head, and wherein said shank is located between said elongated leaf spring members;
 a first panel having a first keyhole, said keyhole having a first slot, and a second panel having a second keyhole and an integral back surface, said second keyhole having a second slot, and wherein said first and second slots are sized to receive said key; and
 wherein said bolt is rotatable from an open position, where said key is aligned with said first and second slots, to a closed position, where said key bears directly against said back surface of said second panel; and
 wherein said integral spring members are arranged to bias said first panel toward said second panel.

16. The fastener system of claim 15, wherein said spring members are located within the radial extent of said head.

17. The fastener system of claim 15, wherein said spring members rest directly on an integral surface of said first panel.

18. The fastener system of claim 15, wherein said bolt has an axis of rotation, and wherein said bolt is rotatable about said axis between said open and closed positions.

19. The fastener system of claim 18, wherein said closed position is spaced apart a quarter turn from said open position.

20. The fastener system of claim 19, wherein said bolt is molded from a resilient material.

21. A fastener system, comprising:
 a bolt having a head, a spring member integral with said head, a shank, and a fastening key attached to said shank opposite said head; and
 a first panel having a first keyhole, said keyhole having a first slot, and a second panel having a second keyhole and an integral back surface, said second keyhole having a second slot, and wherein said first and second slots are sized to receive said key; and
 wherein said bolt is rotatable from an open position, where said key is aligned with said first and second slots, to a closed position, where said key bears directly against said back surface of said second panel;
 wherein said integral spring member is arranged to bias said first panel toward said second panel;
 wherein said bolt has an axis of rotation, and wherein said bolt is rotatable about said axis between said open and closed positions;
 wherein said closed position is spaced apart a quarter turn from said open position;
 wherein said bolt is molded from a resilient material; and
 wherein said fastener system further comprises a curved track on said second panel.

22. The fastener system of claim 21, wherein said track slopes to a crest and recedes to a landing area.

23. The fastener system of claim 22, wherein said first key is retained in said landing area by said spring member.

24. The fastener system of claim 23, further comprising a bump stop located adjacent said second slot.

25. The fastener system of claim 24, further comprising a bump stop located adjacent said landing area.

26. A fastener system, comprising:
- a bolt having a head, a spring member integral with said head, a shank, and a fastening key attached to said shank opposite said head; and
- a first panel having a first keyhole, said keyhole having a first slot, and a second panel having a second keyhole and an integral back surface, said second keyhole having a second slot, and wherein said first and second slots are sized to receive said key; and
- wherein said bolt is rotatable from an open position, where said key is aligned with said first and second slots, to a closed position, where said key bears directly against said back surface of said second panel;
- wherein said integral spring member is arranged to bias said first panel toward said second panel;
- wherein said bolt has an axis of rotation, and wherein said bolt is rotatable about said axis between said open and closed positions;
- wherein said closed position is spaced apart a quarter turn from said open position;
- wherein said bolt is molded from a resilient material; and
- wherein said fastener system further comprises a capture key located on said shank between said head and said fastening key.

27. The fastener system of claim 26, wherein said fastening key extends radially away from said shank in a first direction, and wherein said capture key extends radially away from said shank in a second direction, said second direction being different than said first direction.

28. A fastener system, comprising:
- a bolt having a head, a spring member integral with said head, a shank, and a fastening key attached to said shank opposite said head;
- a first panel having a first keyhole, said keyhole having a first slot, and a second panel having a second keyhole and a back surface, said second keyhole having a second slot, and wherein said first and second slots are sized to receive said key;
- a capture key located on said shank between said head and said fastening key;
- wherein said bolt is rotatable from an open position, where said fastening key is aligned with said first and second slots, to a closed position, where said fastening key bears against said back surface of said second panel; and
- wherein said integral spring member is arranged to bias said first panel toward said second panel.

29. The fastener system of claim 28, wherein said fastening key extends radially away from said shank in a first direction, and wherein said capture key extends radially away from said shank in a second direction, said second direction being different than said first direction.

30. The fastener system of claim 29, wherein said second direction is perpendicular to said first direction.

31. A fastener for fastening a first panel to a second panel, said fastener comprising:
- a head for twisting said fastener;
- a spring member integral with said head for biasing said first and second panels together; and
- a fastening key spaced from said head, said key being engageable with a surface of said second panel;
- a capture key located between said head and said fastening key, said capture key fitting through a slot and engaging said first panel when said fastener is rotated; and
- wherein said head, said spring member and said keys are integrally molded in one piece.

32. The fastener of claim 31, wherein said fastening key extends in a first direction, and said capture key extends in a second direction, said first direction being different from said second direction.

33. The fastener of claim 32, wherein said second direction is perpendicular to said first direction.

34. A method of fastening a first object to a second object, said method comprising the steps of:
- aligning a first keyhole in said first object and a second keyhole in said second object;
- subsequently, moving a bolt shank and an integral key through said first and second keyholes;
- compressing an integral spring directly against an integral surface of said first object; and
- subsequently, twisting said bolt such that said integral key directly engages an integral surface of said second object.

* * * * *